(12) United States Patent
Bilgic et al.

(10) Patent No.: US 9,684,061 B2
(45) Date of Patent: Jun. 20, 2017

(54) METHOD FOR DETERMINING A FILL LEVEL OF A MEDIUM AND DEVICE FOR DETERMINING A FILL LEVEL OF A MEDIUM

(71) Applicant: KROHNE Messtechnik GmbH, Duisburg (DE)

(72) Inventors: Attila Bilgic, Ratingen (DE); Michael Gerding, Bochum (DE)

(73) Assignee: KROHNE Messtechnik GmbH, Duisburg (DE)

(*) Notice: Subject to any disclaimer, the term of this patent is extended or adjusted under 35 U.S.C. 154(b) by 364 days.

(21) Appl. No.: 14/478,028

(22) Filed: Sep. 5, 2014

(65) Prior Publication Data
US 2015/0061919 A1    Mar. 5, 2015

(30) Foreign Application Priority Data

Sep. 5, 2013  (DE) ................ 10 2013 014 689
Nov. 22, 2013 (DE) ................ 10 2013 019 524

(51) Int. Cl.
*G01S 7/02* (2006.01)
*G01F 23/00* (2006.01)
*G01F 23/284* (2006.01)
*G01S 13/88* (2006.01)

(52) U.S. Cl.
CPC ............ *G01S 7/02* (2013.01); *G01F 23/0076* (2013.01); *G01F 23/284* (2013.01); *G01S 13/88* (2013.01)

(58) Field of Classification Search
CPC .... G01F 23/0076; G01F 23/284; G01S 13/88; G01S 7/02
USPC .......................................... 342/124
See application file for complete search history.

(56) References Cited

U.S. PATENT DOCUMENTS

| 5,973,770 A | * | 10/1999 | Carter ................. G01F 23/292 356/4.09 |
| 6,634,234 B1 | | 10/2003 | Haas |
| 7,319,401 B2 | | 1/2008 | Åkerström et al. |
| 8,160,594 B2 | | 4/2012 | Sato et al. |
| 2011/0153294 A1 | | 6/2011 | Yoon et al. |
| 2013/0269414 A1 | * | 10/2013 | Ferraro ................ G01F 23/284 73/1.73 |

FOREIGN PATENT DOCUMENTS

| DE | 10 2004 041 857 A1 | 3/2006 | |
| DE | 10 2009 042 869 A1 | 2/2011 | |
| DE | 10 2010 062 108 A1 | 5/2012 | |
| DE | 102010064394 A1 * | 7/2012 | .......... G01F 23/284 |
| WO | 2012/089438 A1 | 7/2012 | |

* cited by examiner

*Primary Examiner* — Timothy A Brainard
(74) *Attorney, Agent, or Firm* — David S. Safran

(57) ABSTRACT

A method and a device for determining a fill level of a medium using the radar principle that has a high degree of accuracy and reliability. In accordance with the method, an electromagnetic signal is transmitted from a transmitting device and an electromagnetic signal is received for determining the fill level. Thereby, a slope of the transmitting device relative to the force of gravity and an evaluation value dependent on the determined slope are identified for determining the fill level.

8 Claims, 3 Drawing Sheets

METHOD FOR DETERMINING A FILL LEVEL OF A MEDIUM AND DEVICE FOR DETERMINING A FILL LEVEL OF A MEDIUM

BACKGROUND OF THE INVENTION

Field of the Invention

The invention relates to a method for determining a fill level of a medium using the radar principle. Furthermore, the invention relates to a device for determining a fill level of a medium using the radar principle.

Description of Related Art

In industrial measuring technology, radar fill level measuring devices are used to determine fill levels of media such as liquids, bulk materials or also slurries within containers such as tanks or silos or also in open spaces. Thereby, the container can be at least partially closed or at least partially open and consist at least partially of metal, plastic, ceramic or other materials or material combinations. The transit time method used in measurement is based on the transit path of an electromagnetic signal being equal to the product of transit time and propagation velocity.

Electromagnetic signals—in particular microwave signals—are transmitted in the direction of the surface of the medium and received after a reflection as so-called echo signal. The antenna, which is used as transmitting device for transmitting the signal, is often also the receiving device. Often, a digitalized envelope is determined for evaluating the received signal, which represents the amplitudes of the echo signals as a function of distance "antenna—surface of the medium". The fill level results from the difference between the known distance of the antenna to the floor of the container and the distance of the surface of the medium to the antenna determined in the measurement.

Thereby, the microwave signals are either freely emitted or are guided along a cable or rod.

How the antenna or the transmitting device is oriented relative to the surface of the medium is relevant for determining the fill level. In most cases, the transmitting or transmitting/receiving device is mounted vertically over the medium. The electromagnetic signals are thus, generally, transmitted perpendicular to the surface of the medium.

However, it is possible that the antenna has to be mounted at an angle due to particular mounting situations or, for example, the presence of fixtures as disturbing elements in the container.

The German Patent Application DE 10 2004 041 857 A1 and International Patent Application Publication WO 2012/089438 A1 which corresponds to U.S. Patent Application Publication 2013/269414 A1 describe the use of slope sensors for such cases, in order to obtain the angle at which the antenna is sloped. The distance between the antenna and the surface of the medium are determined using trigonometric correlations.

SUMMARY OF THE INVENTION

Thus, the primary object of the present invention is to provide a method and a device for fill level measurement that has a high degree of accuracy and reliability.

The method according to the invention, in which the above derived and described object is met, includes at least the following steps: At least one electromagnetic signal is transmitted for measurement from a transmitting device, which is a dielectric antenna in one design—as an example and without limiting the application of the transmitting device even in other forms. At least one electromagnetic signal is received for measurement. The receiving device thereby coincides with the transmitting device resulting into one collective transmitting/receiving device. Furthermore, a slope of the transmitting device relative to the force of gravity is determined at least once. Then, at least one evaluating value for determining the fill level is determined depending on the determined slope. The slope is determined, in one design, before receiving the measurements, i.e., before the transmission of an electromagnetic signal and thus also before receiving such a signal.

The evaluating value allows for a conclusion about the given measuring situation depending on the design or use, e.g., in respect to safety-critical problems. In other or additional designs, the evaluating value is used for increasing the accuracy of the evaluation of the received signals in view of fill level.

Thus, depending on each special problem, additional information in the form of an evaluating value is obtained from the at least one measurement of slope, which contributes to the improvement of the evaluation or the measuring situation.

In one implementation of the method, it is provided that the evaluating value is set to an error state in the case that the determined slope is outside of a predetermined slope range. In one implementation, the slope range, in which the determined value for the slope is to be found, is a result of the tolerance range in view of the accuracy of the measurement of the slope or in view of the possibility of accuracy of setting the slope of the transmitting device.

In a further design, a fixed value for the slope is provided as slope range. In one design, in particular, the value that exists at a perpendicular orientation of the transmitting device relative to the surface of the medium is given as slope range.

If the determined slope lies outside of the slope range or if the slope—possibly dependent on a predetermined tolerance value, which can also possibly be set to zero—differs from a predetermined value, the result is an error state or the presence of an error state, in the form of an incorrect or invalid orientation of the transmitting device, is identified using the determined slope.

In particular, in one design, the error state leads to the measurement of the fill level being prevented or blocked. In an additional or alternative design, an error signal is provided—e.g., in the form of a flashing error symbol or in the form of an error tone or an error tone sequence.

In a further design, the following method steps are provided: Signal course data is determined at least depending on the determined slope and depending on data pertaining to the container.

In one variation, determination of signal course data consists of a calculation using stored formulas or based on stored algorithms. In addition to data pertaining to the container, which relate to its geometry, but also to its reflecting or absorbing characteristics in respect to electromagnetic signals, further data are possibly used for the calculation.

The determined signal course data describe a propagation of the at least one electromagnetic signal in the interior of the container. At least one trajectory of the electromagnetic signal is thus described by the signal course data.

A transmission measure is determined based on the determined signal course data and the data pertaining to the container—in particular, depending on data pertaining to openings (for example windows or recesses) in the container. The transmission measure describes, thereby, a portion of the propagation of the at least one electromagnetic signal outside of the interior of the container.

Thus, how the electromagnetic signal is propagated within the interior of the container is determined in this design. The evaluation of the reflection of the signal in the interior of the container is a part of this, wherein possible fixtures in the container are to be taken into consideration. A comparison of this signal course data with the stored data of the container then allow for a determination of the transmission measure, which describes which portion of the electromagnetic signals run outside of the container and thus reach the exterior around the container. If, for example, the electromagnetic radiation is transmitted to the walls of the container such that the reflected radiation strikes a window in the wall, then the reflected radiation leaves the interior of the container, which has an impact on the transmission measure.

In addition to the determined slope and in addition to the data pertaining to the container, data pertaining to at least one object in the interior of the container is also used, in one design, in determining the signal course data. The data pertaining to at least one object in the interior of the container relates, in particular, to the geometry, the position and possibly also the material characteristics in view of interaction with electromagnetic signals.

The object in the container or as part of the container is, for example, a stirrer, a filler tube, an additional measuring arrangement, an opening, a window, a recess, a climbing aid, etc.

In this design, the effects of concrete elements or holes (possibly also in respect to impacts at ledges, etc.), which can lead to reflections themselves or to a weakening of signals, are taken into consideration for calculating the course of the electromagnetic signal in the interior of the container.

Thereby, in one design, reflections and multiple reflections of the electromagnetic signal in the container—i.e., in particular, on its inner wall or at recesses, etc.—and/or at the at least one object in the interior of the container are taken into consideration for the determination of signal course data. Depending on the available computing power, the calculation of signal course data is carried out in a more or less complex manner, so that also more or less exact or detailed data about the trajectory of the electromagnetic signal result.

In particular, in one design, the portion of electromagnetic signals running outside of the interior of the container or leaving the container, whether a result of direct signal propagation or of reflections, is determined using the signal course data. In particular, in safety-critical applications, it can be necessary to ensure that no signals or only signals up to a predetermined threshold value leave the container.

Alternatively or additionally, it is monitored whether the transmitting or transmitting/receiving device is incorrectly mounted during initial startup—e.g., does not or does not completely transmit into the interior or is not arranged vertical to the medium or its surface.

Incorrect mounting is, thereby, in one of the above designs, in particular, an alignment of the transmitting device that does not have vertical or perpendicular transmission relative to the surface of the medium.

If the observation in respect to the correct alignment of the transmitting device—as described above—is made using the determined slope, then, in particular, the above described calculations and determinations of the signal path are not necessary.

In one design, an error state is identified in the case that the transmission measure exceeds a predetermined threshold value. Furthermore, at least one error signal is triggered in the case that the error state is identified.

Thereby, the threshold value for the error state is, in one design, zero, so that any escape of the signal out of the interior is identified as an error state.

In one design, the threshold value is predetermined depending on the accuracy of the signal course data and the used calculation accuracy.

Thereby, an error state is—depending on the use—in particular also the event that the transmitting device is not correctly arranged, i.e., is not vertical relative to the medium.

The error signal comprises, in one design, of fill level determination being interrupted and/or denied. The field device, which is used for implementing fill level measurement using the radar principle, denies its services in this design in the case that an error is present, i.e., a signal escapes the interior of the container. Thus, measurement is not possible in this design when the results of the slope angle of the antenna of the field device, of the data pertaining to the container and possibly at least one object, and of the calculations show that at least a part of the electromagnetic signal—either directly or as a result of reflections—escapes the interior. The advantage here is that it is not necessary to measure the electromagnetic signals, but rather it is only necessary to measure the slope. Thus, it is not possible for electromagnetic signals to escape from the container, since this is already prevented previous to fill level measurement.

In an alternative or additional design, the error signal is involves an error signal being displayed. In particular, for non-critical uses, measurement is not prevented or interrupted; rather there is only a display that an error exists. The display of an error signal is, for example, relevant for the alignment of the antenna of the field device during startup or mounting on site.

In a further design, the evaluating value has a further significance—as opposed to or in addition to the above-described evaluation of the guiding of electromagnetic signals in the container.

In one design, which is combined with the above or implemented separately, the slope of the transmitting device relative to the force of gravity is determined at a first point in time and at a second point in time. Based on the slope determined at the first point in time and the slope determined at the second point in time, an orientation of a surface of the medium relative to the container is determined.

If the container is moved or, for example, tilted, the location of the surface of the medium is also changed. It is thereby assumed in one design that the orientation of the transmitting device, i.e., the antenna, remains unchanged. In order to react to the setting between the antenna and the surface of the medium, changed due to movement, it is reasoned that the slope at the second point in time results from the slope of the container and that the medium follows this movement. The medium is thereby, in particular, flowable or pourable and is not rigid.

The two measured slopes are then indicative of the orientation of the surface of the medium in that, e.g., an appropriate calculation is made using geometric correlations. That the medium is distributed differently in the interior of the container due to movement of the container under the influence of gravitation at both measuring times can be interpreted from the two slope angles.

Since, in particular, the surface of the medium serves to reflect the electromagnetic signals, the orientation of the surface is mainly determined and, in particular, calculated.

In one design, the above-described signal course data are determined or, in particular, calculated at least depending on the slope determined at the second point in time and the first point in time, depending on the determined orientation of the surface and depending on data pertaining to at least the container and to at least one object in the interior of the container. Hereby, in particular, the effect of the changed orientation of the surface of the medium relative to the container or relative to the at least one object in the container is taken into consideration for the course of the electromagnetic signal in the container.

In one design, the at least double measurement of the slope serves the goal of identifying whether the transmitting device has been moved or tilted. Thus, an error signal is generated in the case of deviation between the slope determined at the first point in time and the slope determined at the second point in time. Thus, it is, for example, not possible that the container experiences movement; a change of the slope of the transmitting device can only be explained by the transmitting device having been moved, which, in this design, leads to an error signal.

In a further design, the slope of the transmitting device is changed at least once, so that measurements with two different slopes, and thus different orientations of the transmitting device, are carried out. The set slope of the transmitting device is determined for every setting of the transmitting device. The measurements at different slopes of the transmitting device are then combined, in conjunction with the determined slopes, into overall information pertaining to the medium or, especially, to the surface of the medium. By changing the slope of the transmitting device, a surface of the medium, in particular, can be scanned. By determining the slope, for example, a very exact drive for the setting of the slope of the transmitting device, i.e., for tilting, is no longer necessary.

If reference is made to a transmitting device in the description, this can, in particular, also be a transmitting/receiving device that serves to transmit and receive electromagnetic signals. In particular, the transmitting or transmitting/receiving device is an antenna for radar signals.

According to a further teaching, the invention relates to a device for determining the fill level of a medium using the radar principle with at least one transmitting device transmitting at least one electromagnetic signal, having at least one slope sensor for determining a slope of the transmitting device relative to the force of gravity and with at least one calculating device for determining whether the determined slope of the transmitting device lies within a predetermined slope range.

The object is met according to this teaching by a device that has a transmitting device and a slope sensor. The slope sensor is, thereby in one design, a fixed component of the device for determining the fill level and, in an alternative design, is only temporarily attached or coupled to the actual measuring device. Depending on the use, the slope sensor or its functionality can also be switched on and off.

The device is wherein the orientation of the transmitting device is determined by the slope sensor and that the calculating device uses the determined slope value to determine whether the slope of the transmitting device lies within a predeterminable—and thus defined as suitable—slope range. It is thus determined whether the slope of the transmitting device lies within an allowable range. The calculating device is, thereby, in one design, an integral component of the device and, in an alternative design, is temporarily attached to the device and possibly is coupled with the device via a data connection—for example a fieldbus.

In one design, the slope sensor and/or the calculating device can be temporarily joined to the device. This design is, for example, advantageous for the situation in which the mounting of the device relative to the measuring surroundings is to be controlled during startup. Measuring devices without their own or installed slope sensors can be upgraded to devices according to the invention using this design.

The device thereby allows the implementation of the above-described method steps. Thereby, the calculating device additionally carries out the above steps or alternatively the above method steps.

In one design, the calculating device is designed in such a manner that it displays an error state in the case that the determined slope of the transmitting device lies outside of the slope range.

Examples for the display and signaling of the error state have already been described in the above designs for the method.

In one design, in particular, the calculating device interrupts or blocks measurement of the device for determining fill level. Alternatively or additionally, the calculating device requests a confirmation code in order to allow measurement despite the incorrect alignment of the transmitting device. In one design, the calculating device visually displays an error state via a display unit or a display. Alternatively or additionally, an error signal is acoustically issued, e.g., in the form of a beep.

However, for the greatest safety, measurement is additionally or alternatively inhibited or blocked in the case of a slope of the transmitting device outside of the allowable range.

The predeterminable slope range is, in the following design, essentially limited to one value or one slope angle. The limitation to one slope angle is, in one design, associated with a sort of tolerance width, which is obtained from the measuring accuracy of the slope sensor and/or from the accuracy of the alignment of the transmitting device. Thus, it is monitored in the latter design whether the determined slope corresponds to the respective, determined or allowed tolerance range with the predetermined slope value.

Thus, it is provided in one design that the slope range corresponds to an essentially vertical transmission of electromagnetic signals of the transmitting device in the direction of a surface of the medium and/or to an essentially vertical alignment of the transmitting device relative to the surface of the medium. The slope range, in this design, becomes more of a slope value, around which the said tolerance range is placed in an additional design.

According to the standard ETSI EN 302 729: "Electromagnetic compatibility and Radio spectrum Matters (ERM), Short Range Devices (SRD); Level Probing Radar (LPR) equipment operating in the frequency ranges 6 GHz to 8.5 GHz, 24.05 GHz to 26.5 GHz, 57 GHz to 64 GHz, 75 GHz to 85 GHz", a vertical alignment of the transmitting device above the medium is required in order to avoid undesired transmission effects due to a tilted, i.e., incorrectly oriented antenna in open-space measurements.

Thus, the slope of the transmitting device is determined by the slope sensor in the device according to the invention and, in particular, in conjunction with the above designs, the slope is constantly monitored in one design in view of the measurements of the slope occurring at different points in time. According to one design, the measuring device is, in particular, turned off in the case of incorrect alignment.

The device according to the invention thus allows the certitude that measurement is only possible when the alignment of the transmitting device conforms to standards.

The discussed characteristics and designs of the device according to the invention can be accordingly used or implemented in the above-described method according to the invention.

In detail, there are numerous possibilities for designing and further developing the method according and device according to the invention as will become apparent from the following description of embodiments in conjunction with the accompanying drawings.

DETAILED DESCRIPTION OF THE INVENTION

Figure 1:
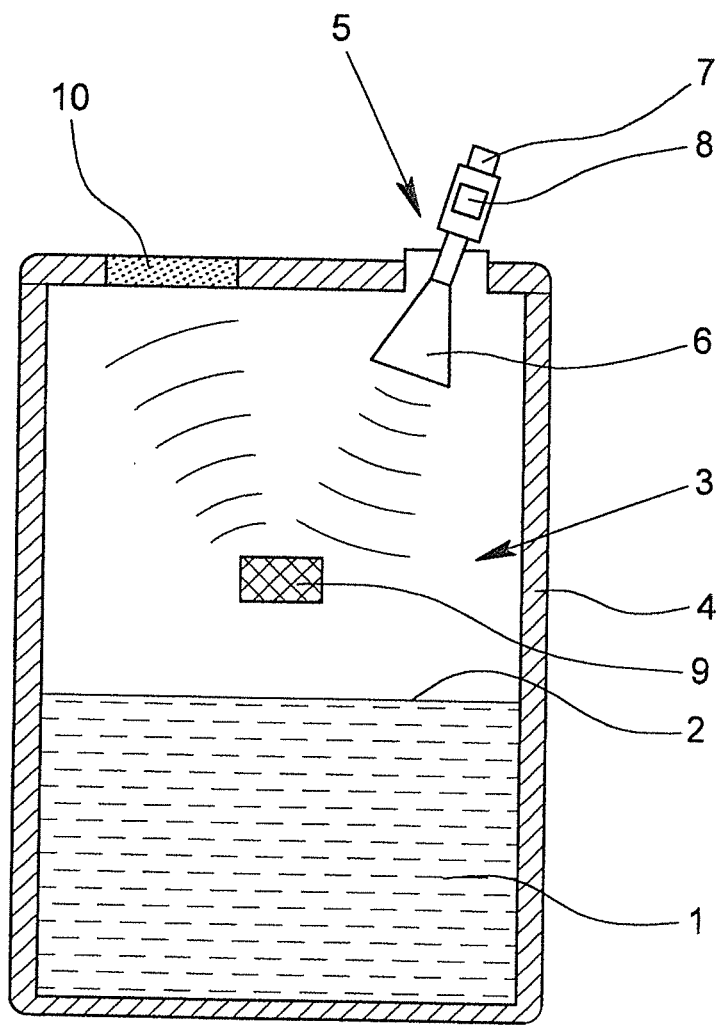
FIG. 1 is a schematic illustration of a first particular application of the method and device.

A particular application is illustrated in FIG. 1, in which the fill level of a medium 1 is to be determined using reflections of radar signals on its surface 2 in the interior 3 of a container 4.

A measuring device 5 is used for fill level measurement that has a transmitting/receiving device 6 in the form of a horn antenna for electromagnetic signals.

In order to determine the slope of the transmitting/receiving device 6 relative to the force of gravity, a slope sensor 7 is provided here, which, depending on the design, is only temporarily or constantly connected to the measuring device 5. Here, a continuous connection is provided so that the slope sensor 7, in particular, is also in contact with the calculating device 8 in the measuring device 5.

The slope sensor 7 determines the slope of the transmitting/receiving device 6 and allows the calculating device 8 to determine signal course data for the course of the electromagnetic signal transmitted by the transmitting/receiving device 6 within the interior of the container 4. For this, data pertaining to the container 4, and in particular here, also data pertaining to an object 9 and a window 10 as part of the container 4 are stored in the calculating device 8. The data relate to the geometry or the location/position or the material characteristics in respect to interaction with electromagnetic signals.

Based on the determined signal course data, it arises that the electromagnetic signal at least partially escapes through the window 10 as a result of reflections on the object 9 (shown here using the schematic illustration of the signals). Thus, a transmission measure greater than zero also arises. This means that the electromagnetic signals do not completely remain in the interior 3, rather leave the container 4.

Thus, it is provided in the illustrated embodiment that the measuring device 5 is unable to measure the fill level, and in particular, does not transmit electromagnetic signals. Thus, it is possible to prevent radar signals from leaving the interior 3 before a first fill level measurement.

The evaluating value determined as part of the method according to the invention describes how closed the container 4 is in the situation shown in respect to electromagnetic signals, and thus, allows measurements, since the signals are prevented from reaching the exterior. The evaluating value thus serves the safety of the measurements or the zones surrounding the container 4 in safety-critical applications.

The transmitting device 6 is not arranged vertically above the surface 2 of the medium 1. Thus, if the measuring device were designed in a manner, in which the calculating device 8 monitors the slope of the transmitting device 6 so that the slope only lies within a predetermined range or, in particular, only complies with a vertical alignment, then the calculating device 8 would preferably cause blocking of fill level measurement at the illustrated alignment.

Figure 2:
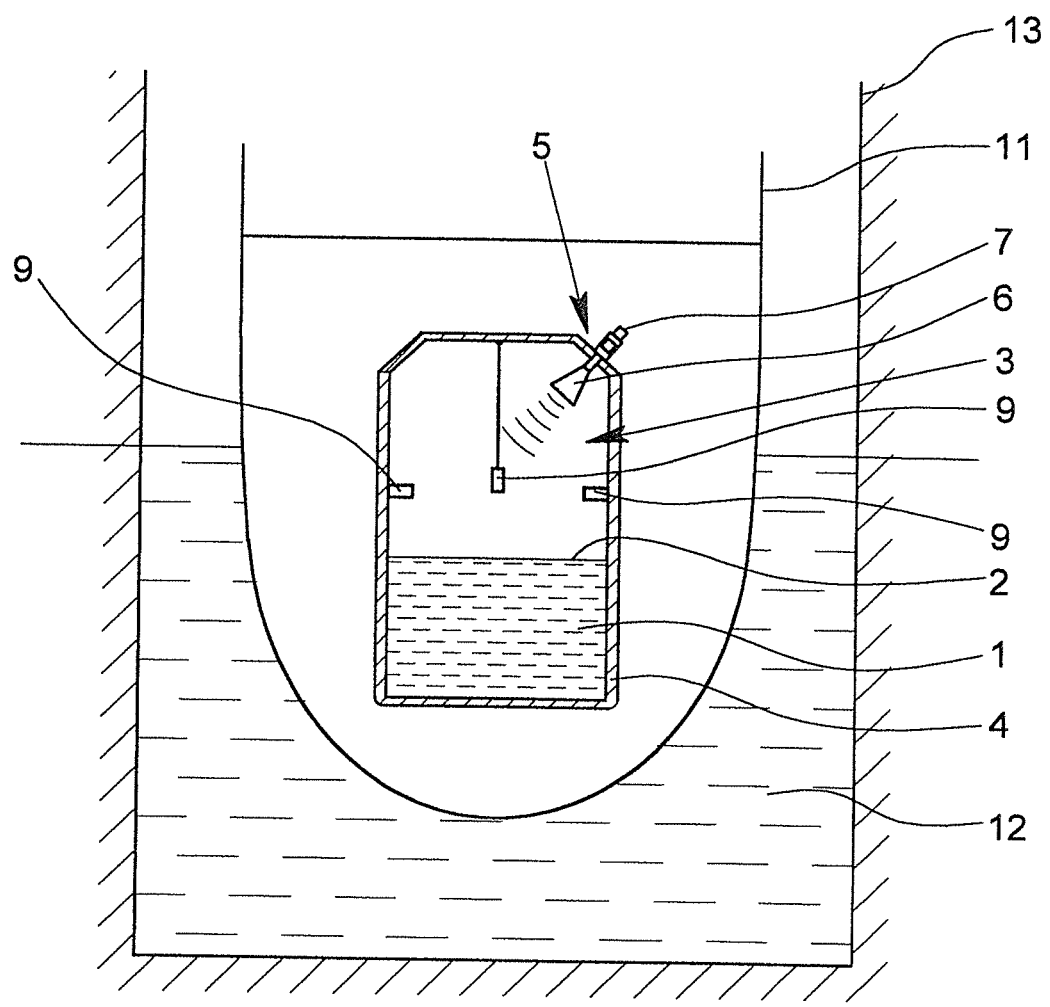
FIG. 2 is a schematic illustration of a second particular application at a first point in time.
Figure 3:
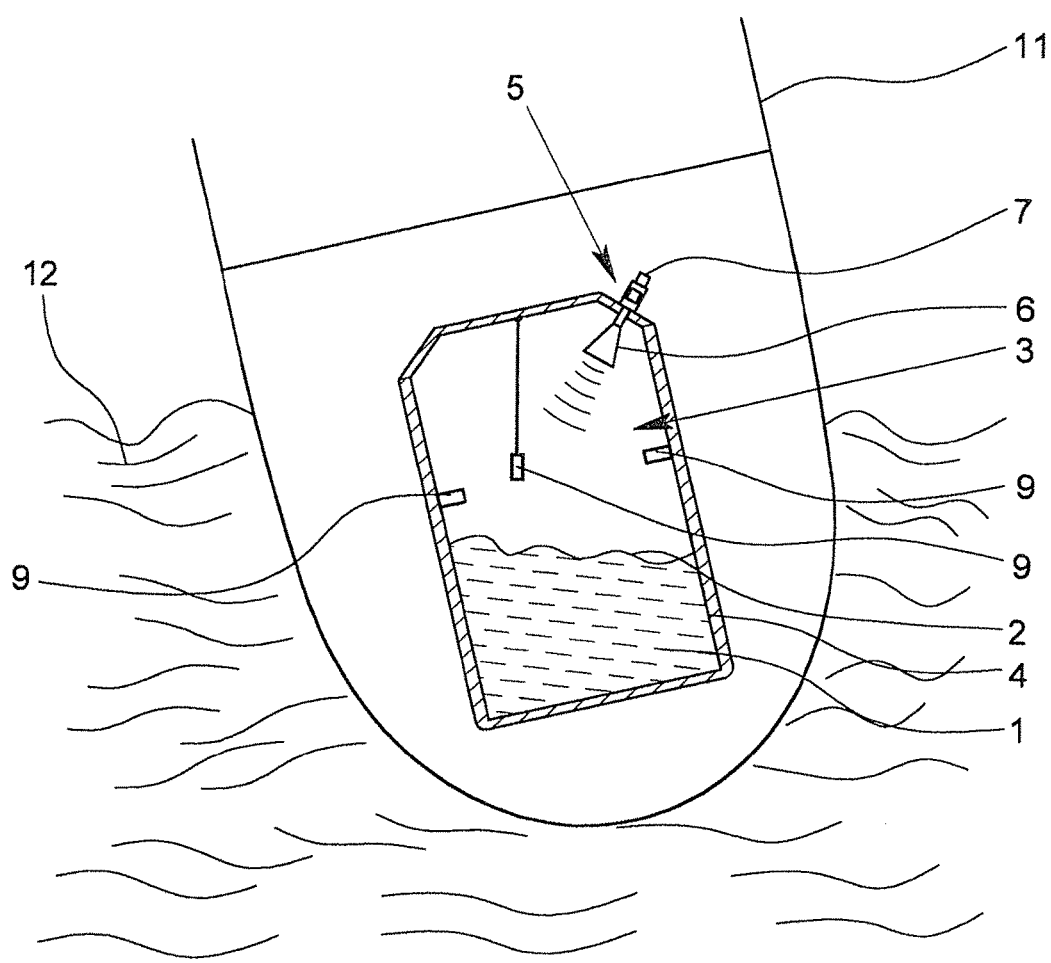
FIG. 3 shows the second particular application of FIG. 2 at a second point in time.

A further measuring situation at two different points in time is illustrated in FIGS. 2 and 3.

The container 4 of FIG. 2 is located in a ship 11, which is surrounded by water 12 while at dock 13. The surface 2 of the medium 1 of the container 4 in the ship 11 has a first orientation relative to the container 4 at the upright position of the ship 11 and, here, in particular, is essentially parallel to the floor of the container 4.

Three objects 9 as fixtures are located in the container 4. Of these, two are climbing aids attached to the wall of the container and a further object 9 extends into the interior 3 of the container 4 on a cable.

The slope sensor 7 determines the slope of the transmitting/receiving device 6 relative to the force of gravity at the first point in time of FIG. 2. The signal course data and the transmission measure are initially determined here, as in the example of FIG. 1, using this slope angle and the data pertaining to the container 4 or the objects 9.

The evaluating value essential for this particular application is made clear in FIG. 3.

In FIG. 3, the ship 11 is at sea and is tilted due to swell.

The tilting of the ship 11 occurs due to the effect of gravity, as does the medium 1 within the container 4, which is affixed in the ship 11. In order to correctly determine the fill level of the medium 1 in this state using electromagnetic signals reflected on its surface 2, the slope of the transmitting/receiving device 6 is measured again at the illustrated second point in time.

Since the transmitting/receiving device 6 itself is attached, i.e., its orientation relative to the container 4 does not change, the slope angle measured at the second point in time results from the tilting of the container 4 or the ship 11 in relation to the field of gravity.

Thus, the second slope angle can be used for determining, in particular calculating, the orientation of the surface 2 of the medium 1 relative to the container 4. The stored or known data pertaining to the container 4 and possibly the objects 9 are also used for the calculation.

Since the position of the objects 9 in the interior 3 of the container 4 can also change when the container 4 is tilted (see object 9 on the cable), it can also be necessary under these conditions to re-calculate the signal course data, i.e., at a second point in time.

What is claimed is:

1. Method for determining a fill level of a medium according to the radar principle, comprising the steps of:
transmitting at least one electromagnetic signal from a transmitting device and
receiving at least one electromagnetic signal for determining the fill level,
wherein a slope of the transmitting device relative to the force of gravity is determined at least once,
wherein at least one evaluating value for determining the fill level is determined from the determined slope, wherein signal course data are determined at least in dependence on the determined slope and in dependence on data pertaining to the container, wherein the signal course data describe propagation of at least one electromagnetic signal in the interior of the container and wherein a transmission measure is determined based on the signal course data and the data pertaining to the container, and wherein the transmission measure describes a portion of the propagation of at least one electromagnetic signal outside of the interior of the container.

2. Method according to claim 1, wherein an error state is identified in the case that the transmission measure exceeds a predetermined threshold value and wherein, in the case that the error state is identified, at least one error signal is triggered.

3. Method according to claim 2, wherein the error signal produces at least one of interrupting and preventing of determination of the fill level.

4. Method according to claim 1, wherein the slope of the transmitting device relative to the force of gravity is determined at a first point in time, wherein the slope of the transmitting device relative to the force of gravity is determined at a second point in time and wherein, in dependence on the slope determined at the first point in time and the slope determined at the second point in time, an orientation of a surface of the medium is determined relative to the container.

5. Method according to claim 4, wherein an error state is generated in the case of a deviation between the slope determined at the first point in time and at the second point in time.

6. Device for determining a fill level of a medium in a container according to the radar principle, comprising:
   at least one transmitting device for transmitting at least one electromagnetic signal,
   at least one slope sensor for determining a slope of the transmitting device relative to the force of gravity and
   at least one calculating device for determining if the determined slope of the emitting device lies within a predetermined slope range,
   wherein said at least one calculating device is adapted to determine signal course data that describes propagation of at least one electromagnetic signal in the interior of the container at least in dependence on the determined slope and in dependence on data pertaining to the container, and
   wherein said at least one calculating device is adapted to determine a transmission measure that describes a portion of the propagation of at least one electromagnetic signal outside of the interior of the container based on the signal course data and the data pertaining to the container.

7. Device according to claim 6, wherein the calculating device displays an error state in the case that the determined slope of the transmitting device lies outside of the predetermined slope range.

8. Device according to claim 6, wherein the slope range corresponds to at least one of an essentially vertical transmitting of electromagnetic signals of the transmitting device in a direction toward a surface of the medium and an essentially vertical alignment of the transmitting device relative to the surface of the medium.

* * * * *